United States Patent
Saito et al.

(10) Patent No.: US 8,509,611 B2
(45) Date of Patent: Aug. 13, 2013

(54) LENS CONTROLLING DEVICE AND IMAGING APPARATUS USING THE SAME

(75) Inventors: Koji Saito, Kyoto (JP); Akihito Saito, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 98 days.

(21) Appl. No.: 13/288,120

(22) Filed: Nov. 3, 2011

(65) Prior Publication Data

US 2012/0114322 A1     May 10, 2012

(30) Foreign Application Priority Data

Nov. 10, 2010   (JP) .................................. 2010-252165

(51) Int. Cl.
*G03B 13/00*     (2006.01)
*G05D 3/12*      (2006.01)

(52) U.S. Cl.
USPC ............................ 396/97; 396/133; 318/634

(58) Field of Classification Search
USPC .................. 396/97, 133; 318/634, 471, 432, 318/560
See application file for complete search history.

(56) References Cited

U.S. PATENT DOCUMENTS

| | | | | |
|---|---|---|---|---|
| 4,982,216 A | * | 1/1991 | Kudo et al. | 396/97 |
| 5,525,885 A | * | 6/1996 | Sato | 318/632 |
| 6,148,152 A | | 11/2000 | Cazier et al. | |
| 6,249,647 B1 | | 6/2001 | Cazier et al. | |
| 6,282,380 B1 | * | 8/2001 | Yamamoto | 396/97 |
| 6,298,199 B1 | * | 10/2001 | Okubo et al. | 396/97 |
| 7,885,529 B2 | * | 2/2011 | Honjo et al. | 396/133 |
| 8,174,608 B2 | * | 5/2012 | Hara et al. | 348/357 |
| 8,339,093 B2 | * | 12/2012 | Lu et al. | 318/807 |
| 2008/0054835 A1 | * | 3/2008 | Tamaru | 318/634 |
| 2011/0031924 A1 | * | 2/2011 | Honda | 318/634 |

FOREIGN PATENT DOCUMENTS

| | | |
|---|---|---|
| JP | 2001-016496 | 1/2001 |
| JP | 2002-357762 | 12/2002 |

* cited by examiner

*Primary Examiner* — Clayton E LaBalle
*Assistant Examiner* — Leon W Rhodes, Jr.
(74) *Attorney, Agent, or Firm* — Fish & Richardson P.C.

(57) ABSTRACT

A lens controlling device disclosed herein includes: a servo calculation section which calculates a motor current setting value such that a lens position detection signal which is inputted from a photo reflector agrees with a predetermined target lens position setting signal; a motor driver which generates a motor current in accordance with the motor current setting value, and supplies the motor current to a lens drive motor; and a temperature correction calculation section which monitors the motor current setting value to generate the temperature correction signal, and corrects either one of the target lens position setting signal and the lens position detection signal.

15 Claims, 7 Drawing Sheets

LENS CONTROLLING DEVICE AND IMAGING APPARATUS USING THE SAME

CROSS-REFERENCE TO RELATED APPLICATIONS

This application is based on the following Japanese patent application, the contents of which are hereby incorporated by reference.
(1) JP-A-2010-252165 (filed on: Nov. 10, 2010)

BACKGROUND OF THE INVENTION

1. Field of the Invention

The present invention is related to a lens controlling device that uses a photo reflector as lens position detecting means, and the present invention is also related to an imaging apparatus using the same.

2. Description of Related Art

JP-A-2002-357762 (hereinafter, referred to as Patent Document 1) discloses a camera that is provided with a zoom lens and in which the position of the zoom lens is detected and controlled by using a photo reflector.

Also, JP-A-2001-16496 (hereinafter, referred to as Patent Document 2) discloses a digital imaging apparatus that detects the dark current of a photo-detector array, and corrects aberration (change in thickness of lens elements that constitute a lens system and change in distance between the lens elements) induced by temperature change.

Figure 7:
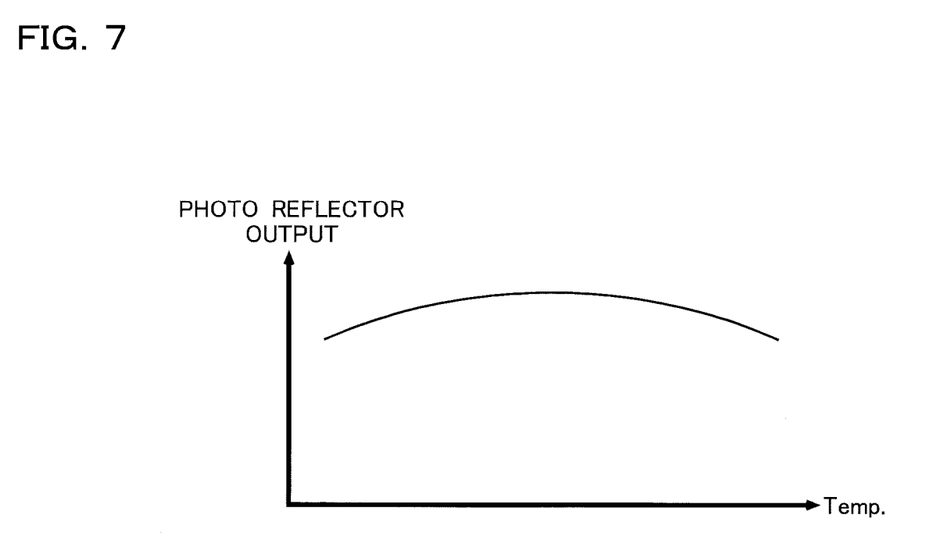
FIG. 7 A diagram showing the temperature characteristic of a photo reflector.

However, conventional lens controlling devices that use a photo reflector as lens position detecting means suffer from the disadvantage that the temperature characteristic of the photo reflector (see FIG. 7) prevents a lens from being driven to its correct target position.

Note that the conventional art disclosed in Patent Document 2 merely corrects aberration of a lens system induced by temperature change, and thus the problem that it aims to solve is different from the problem that the present invention aims to solve, which is compensating for the temperature characteristic of a photo reflector.

In addition, in the conventional art disclosed in Patent Document 2, aberration of a lens system is corrected based on the dark current of a photo-detector array, and thus it is different, in essential features, from the present invention which generates temperature correction signals from the output signal (a photo-electric current) of a photo reflector. In a case where the conventional art of Patent Document 2 is applied as it is as means for compensating for the temperature characteristic of a photo reflector, it is necessary to measure the dark current of the photo reflector. Thus, in order to compensate for the temperature characteristic of the photo reflector while it is operating (i.e., while reflected light is being received), in addition to a light receiving element for measuring a photo-electric current, there must be provided a light receiving element for measuring a dark current, and this invites increase in size and cost of the photo reflector. On the other hand, if the photo reflector includes only a single light receiving element, the measurement of a dark current must be carried out while the photo reflector is not operating, and this makes it impossible to deal with a temperature change occurring while the photo reflector is operating, and thus degrades the accuracy of lens control.

SUMMARY OF THE INVENTION

In view of the foregoing problem found by the inventors of the present application, an object of the present invention is to provide a lens controlling device that is capable of driving a lens to a target position thereof without depending on the temperature characteristic of a photo reflector, and an imaging apparatus using the same.

To achieve the above object, according to one aspect of the present invention, a lens controlling device includes: a servo calculation section which calculates a motor current setting value such that a lens position detection signal which is inputted from a photo reflector agrees with a predetermined target lens position setting signal; a motor driver which generates a motor current in accordance with the motor current setting value and supplies the motor current to a lens drive motor; and a temperature correction calculation section which monitors the motor current setting value to generate a temperature correction signal, and corrects either one of the target lens position setting signal and the lens position detection signal.

According to another aspect of the present invention, a lens controlling device includes: a servo calculation section which calculates a motor current setting value such that a lens position detection signal which is inputted from a photo reflector agrees with a predetermined target lens position setting signal; a motor driver which generates a motor current in accordance with the motor current setting value and supplies the motor current to a lens drive motor; and a temperature correction calculation section which monitors the motor current setting value to generate a temperature correction signal, and corrects a drive current of the photo reflector. Here, the temperature correction calculation section includes an integrator which integrates the motor current setting value, and the temperature correction calculation section generates the temperature correction signal based on an output signal of the integrator.

These configurations make it possible to provide a lens controlling device capable of driving a lens to its target position without depending on the temperature characteristic of a photo reflector, and an imaging apparatus using such a lens controlling device.

Other features, elements, steps, advantages and characteristics of the present invention will become more apparent from the following detailed description of preferred embodiments thereof and the attached drawings.

DETAILED DESCRIPTION OF PREFERRED EMBODIMENTS

First Embodiment

Figure 1:
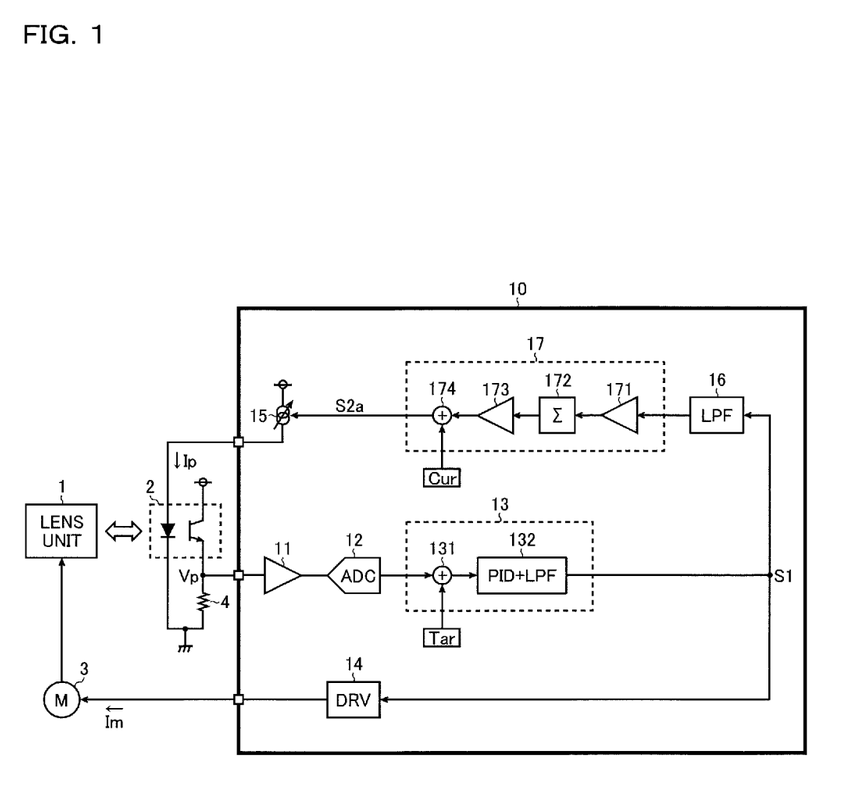
FIG. 1 A block diagram showing a first embodiment of a lens controlling device according to the present invention.

FIG. 1 is a block diagram showing a first embodiment of a lens controlling device (furthermore, an imaging apparatus provided therewith) according to the present invention. The imaging apparatus of this embodiment has a lens unit 1, a photo reflector 2, a lens drive motor 3, a resistor 4, and a lens controlling device 10.

The lens unit 1 forms an optical image of a subject on an imaging device (such as a CCD (charge coupled device) or a CMOS (complementary metal oxide semiconductor)). Here, the lens unit 1 is a movable member which is elastically supported with respect to a stationary member by using a support member such as a spring.

The photo reflector 2 is a proximity sensor composed of: a light emitting section (such as a light emitting diode) which irradiates the lens unit 1 with light; and a light receiving section (such as a photo-transistor) which generates a photo-electric current in accordance with the intensity of light returning from the lens unit 1, and the photo reflector 2 detects the position of the lens unit 1 (that is, the distance between the lens unit 1 and the photo reflector 2).

The lens drive motor 3 drives the lens unit 1 according to a motor current Im.

The resistor 4 generates a lens position detection signal Vp (an analog voltage signal) by performing current/voltage conversion of the photo-electric current (an analog current signal) generated by the photo reflector 2.

The lens controlling device 10 is a semiconductor device having the following components integrated therein: an amplifier 11, an analog/digital converter 12, a servo calculation section 13, a motor driver 14, a current supply 15, a low-pass filter 16, and a temperature correction calculation section 17.

The amplifier 11 performs analog amplification of the lens position detection signal Vp (an analog voltage signal) which is inputted from one end of the resistor 4, and outputs the resulting signal to the analog/digital converter 12.

The analog/digital converter 12 performs analog/digital conversion of the lens position detection signal Vp (an analog voltage signal) which has undergone the analog amplification and is inputted from the amplifier 11, and the analog/digital converter 12 outputs the resulting signal to the servo calculation section 13.

The servo calculation section 13 calculates a motor current setting value S1 such that the lens position detection signal Vp (a digital signal), which is inputted from the photo reflector 2 via the amplifier 11 and the analog/digital converter 12, agrees with a predetermined target lens position setting signal Tar. Here, the servo calculation section 13 includes: an offset circuit 131 which gives the target lens position setting signal Tar an offset in accordance with the lens position detection signal Vp; and a filter circuit 132 which generates the motor current setting value S1 by applying predetermined digital filter processing (PID (P: proportional, I: integral, D: differential) processing and LPF (low-pass filter) processing) to an output signal of the offset circuit 131.

The motor driver 14 is provided with, for example, an H-bridge type output stage, and generates the motor current Im in accordance with the motor current setting value S1, and supplies the motor current Im to the lens drive motor 3.

The current supply 15 supplies a drive current Ip to the photo reflector 2 (more specifically, to the light emitting section of the photo reflector 2). In particular, in the lens controlling device 10 of the first embodiment, the current supply 15 is built as a variable current supply which is capable of performing analog correction of the drive current Ip of the photo reflector 2 according to a temperature correction signal S2a which is inputted from the temperature correction calculation section 17. Incidentally, the operation of correcting the drive current Ip in accordance with the temperature correction signal S2a will be described later in detail.

The low-pass filter 16 performs digital smoothing of the motor current setting value S1, and outputs the resulting value to the temperature correction calculation section 17. By using the above-described low-pass filter 16, noise components superimposed on the motor current setting value S1 can be removed, and thus, it is possible to extract more accurately a direct-current offset component that varies depending on the temperature characteristic of the photo reflector 2.

The temperature correction calculation section 17 monitors the motor current setting value S1 that has undergone the digital smoothing and is inputted via the low-pass filter 16 to generate the temperature correction signal S2a, and corrects the drive current Ip of the photo reflector 2 such that the motor current Im is zero. Here, the temperature correction calculation section 17 includes: an amplifier 171 that performs digital amplification of output signals of the low-pass filter 16; an integrator 172 which performs digital integration of output signals of the amplifier 171; an amplifier 173 which performs digital amplification of output signals of the integrator 172; and an offset circuit 174 which gives an offset in accordance with an output signal of the amplifier 173 to a predetermined drive current reference value Cur to generate the temperature correction signal S2a. With the above-described configuration where the temperature correction calculation section 17 includes the integrator 172, it is possible to increase the feedback gain of the temperature correction calculation section 17. Also, with the above-described configuration where the temperature correction calculation section 17 includes the amplifier 171 and the amplifier 173, it is possible to perform fine adjustment of the feedback gain of the temperature correction calculation section 17.

Figure 2:
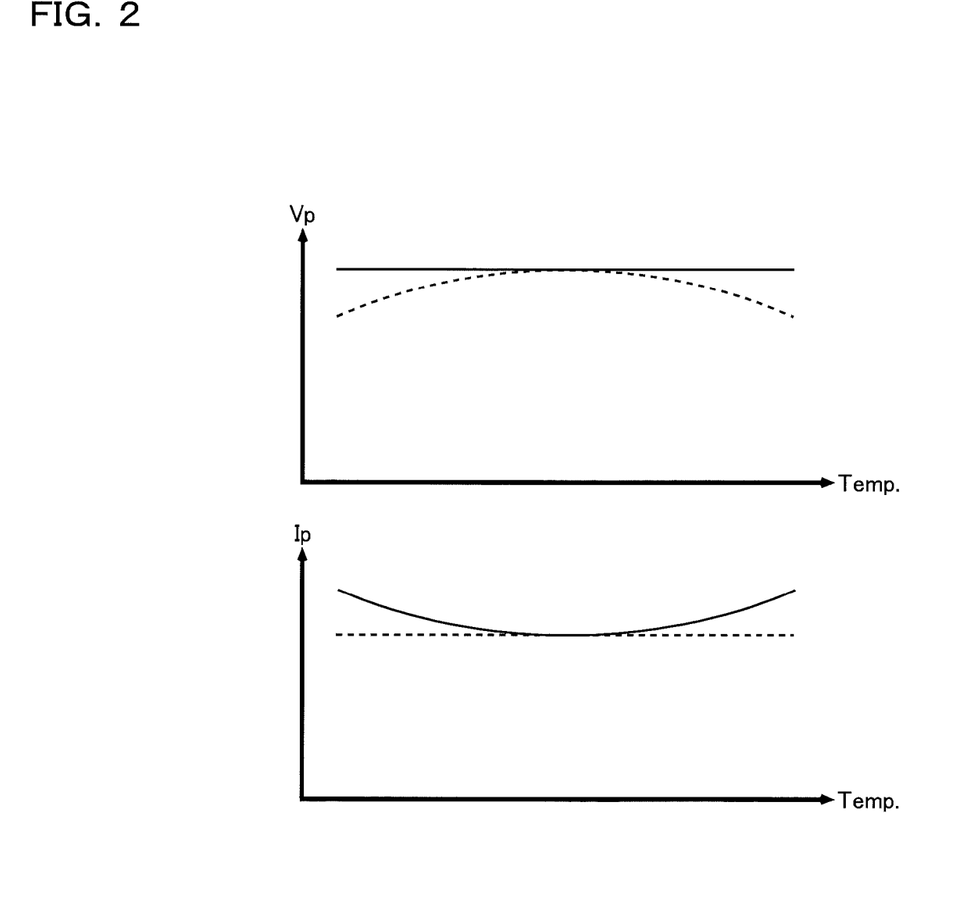
FIG. 2 A diagram for illustrating an operation of correcting a drive current Ip.

FIG. 2 is a diagram for illustrating the operation of correcting the drive current Ip performed in the first embodiment. The upper part of FIG. 2 shows the relationship between temperature and the lens position detection signal Vp, while the lower part of FIG. 2 shows the relationship between temperature and the drive current IP of the photo reflector 2. The solid lines in FIG. 2 indicate behaviors observed with the present invention (with correction of the drive current Ip), while the broken lines indicate conventionally observed behaviors (without correction of the drive current Ip).

As shown in the figure, in the lens controlling device 10 of the first embodiment, when the lens position detection signal Vp is reduced due to the temperature characteristic of the photo reflector 2, the drive current Ip of the photo reflector 2 is increased to compensate for the reduction. By correcting the drive current Ip in the above-described manner, the lens position detection signal Vp in accordance with the position of the lens unit 1 can be obtained without depending on the temperature characteristic of the photo reflector 2, and this makes it possible to drive the lens unit 1 correctly to its target position.

Also, with the lens controlling device 10 of the first embodiment, it is possible to compensate for the temperature characteristic of the photo reflector 2, without using a temperature sensor, with a simple feedback system of correcting the drive current Ip such that the motor current Im is zero, and thus it is possible to avoid undesired increase in cost or in system scale.

Also, with the lens controlling device 10 of the first embodiment, it is possible to enlarge the movable range of the lens unit 1 (the variable range of the lens position detection signal Vp) to a maximum with respect to the input dynamic range of the analog/digital converter 12, and this is advantageous, for example, in enhancing the hand-movement blurring correcting capability of a hand-movement blurring correction mechanism that uses the lens controlling device 10.

It should be noted, however, that it is difficult, with the lens controlling device 10 of the first embodiment, to enhance the analog resolution capability of the current supply 15 (corresponding to the step of correcting the drive current Ip), and thus the motion of the lens unit 1 is easily seen during the correcting operation.

Second Embodiment

Figure 3:
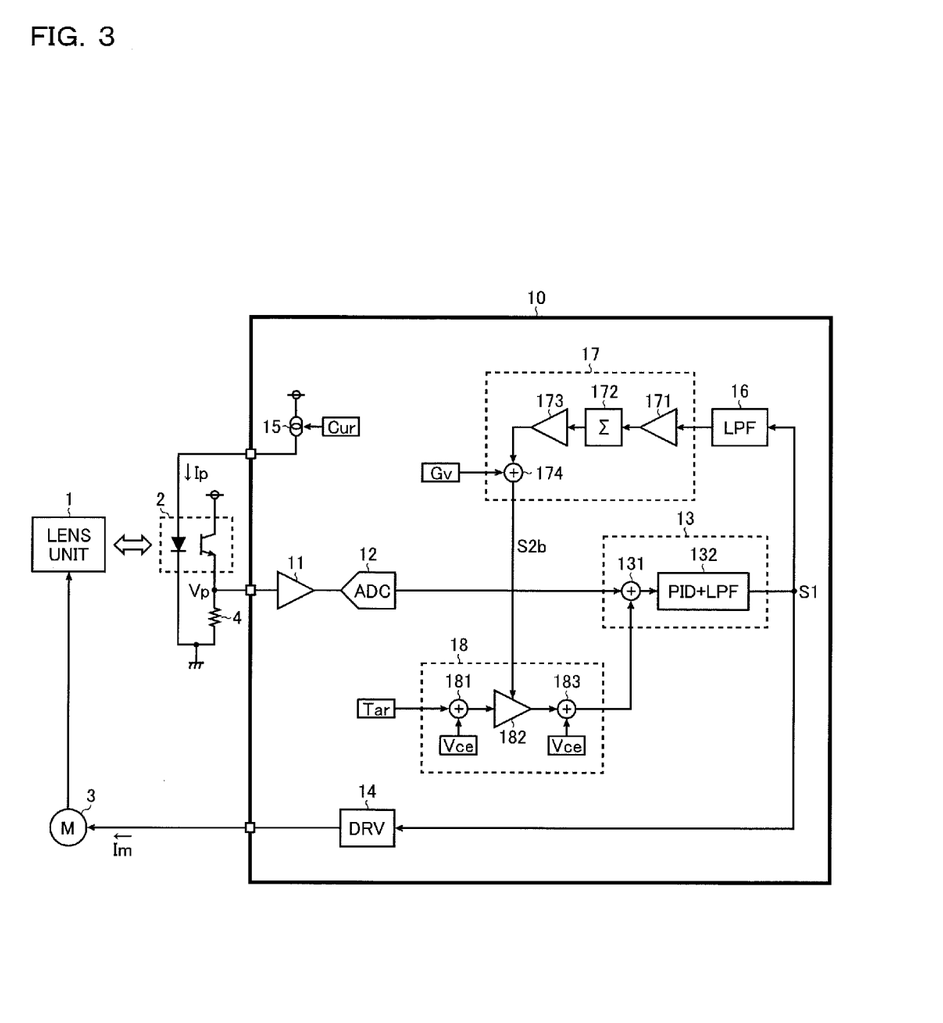
FIG. 3 A block diagram showing a second embodiment of the lens controlling device according to the present invention.

FIG. 3 is a block diagram showing a second embodiment of the lens controlling device (and further, an imaging apparatus provided therewith) according to the present invention. Such components as find their counterparts in the first embodiment are identified by the same reference signs as in FIG. 1 to omit overlapping descriptions thereof, and the descriptions below will be concentrated on the features of the second embodiment.

In the lens controlling device 10 of the second embodiment, an offset circuit 174 of a temperature correction calculation section 17 generates a temperature correction signal S2b by giving an offset in accordance with an output signal of an amplifier 173 to a predetermined digital gain reference value Gv, and outputs the temperature correction signal S2b to a target lens position setting signal correction section 18. Incidentally, in the lens controlling device 10 of the second embodiment, a current supply 15 is built as a constant current supply which generates a constant drive current IP according to a predetermined drive current reference value Cur.

The target lens position setting signal correction section 18 performs digital correction of a target lens position setting signal Tar according to the temperature correction signal S2b such that a motor current Im is zero. Here, the target lens position setting signal correction section 18 includes: an offset circuit 181 (see step (1) of FIG. 4) which temporarily offsets a target lens position setting signal Tar to a zero position; an amplifier 182 (see step (2) of FIG. 4) which performs digital amplification of output signals of the offset circuit 181 by a gain in accordance with the temperature correction signal S2b; and an offset circuit 183 (see step (3) of FIG. 4) that offsets the target lens position setting signal Tar' resulting from the digital amplification again to the original position.

Figure 4:
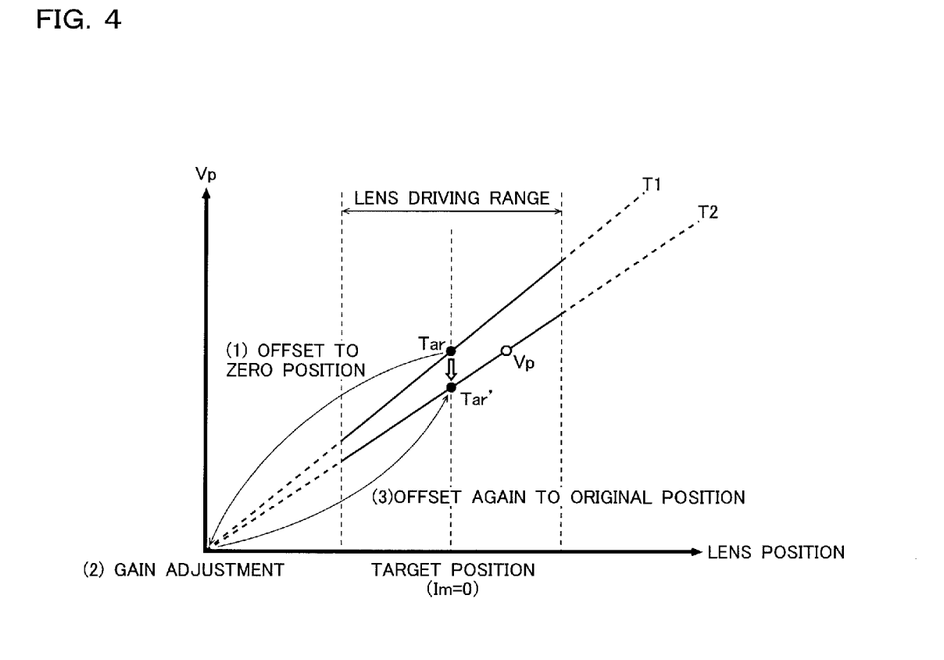
FIG. 4 A diagram for illustrating an operation of correcting a target lens position setting signal Tar.

FIG. 4 is diagram for illustrating an operation of correcting the target lens position setting signal Tar performed in the second embodiment. In FIG. 4, the horizontal axis indicates the lens position, while the vertical axis indicates a lens position detection signal Vp.

As shown in the figure, in the lens controlling device 10 of the second embodiment, the target lens position setting signal Tar is corrected (from Tar to Tar') not by simply comparing the target lens position setting signal Tar that is set on the assumption that the temperature is T1 and the lens position detection signal Vp that is detected when the temperature is T2, but by cancelling out the amount by which the lens position detection signal Vp varies due to the temperature characteristic of the photo reflector 2. By correcting the target lens position setting signal Tar in the above-described manner, like in the above-discussed first embodiment, it is possible to correctly drive the lens unit 1 to its target position without depending on the temperature characteristic of the photo reflector 2.

Also, with the lens controlling device 10 of the second embodiment, the operation of correcting the target lens position setting signal Tar can be achieved simply through digital processing, it is easy to enhance the digital resolution capability of the amplifier 182 (corresponding to the step of correcting the target lens position setting signal Tar), and it is possible to make the motion of the lens unit 1 less visible during the correction operation in comparison with the above-discussed first embodiment.

However, it should be noted that, in the lens controlling device 10 of the second embodiment, consideration must be given to the correction margin of the target lens position setting signal Tar in setting the movable range of the lens unit 1 (the variable range of the lens position detection signal Vp), and thus the movable range of the lens unit 1 cannot be enlarged to a maximum with respect to the input dynamic range of the analog/digital converter 12.

Also, it should be noted that the lens controlling device 10 of the second embodiment, in which no feedback is performed with respect to a servoloop itself that generates the motor current Im from the lens position detection signal Vp, slightly lacks followability to, and stability against, temperature change.

Third Embodiment

Figure 5:
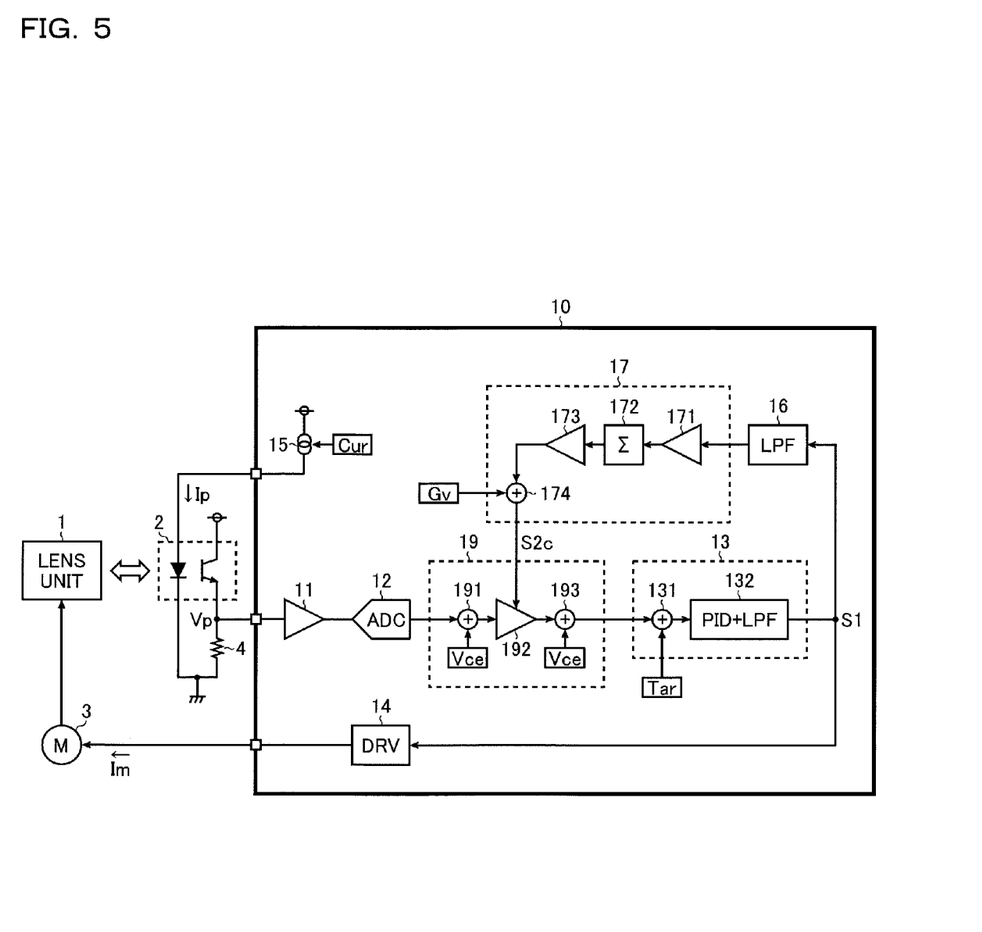
FIG. 5 A block diagram showing a third embodiment of the lens controlling device according to the present invention.

FIG. 5 is a block diagram showing a third embodiment of the lens controlling device (furthermore, an imaging apparatus provided therewith) according to the present invention. Such components as find their counterparts in the first embodiment are identified by the same reference signs as in FIG. 1 to omit overlapping descriptions thereof, and the descriptions below will be concentrated on the features of the third embodiment.

In the lens controlling device 10 of the third embodiment, an offset circuit 174 of a temperature correction calculation section 17 generates a temperature correction signal S2c by giving an offset in accordance with an output signal of an amplifier 173 to a predetermined digital gain reference value Gv, and outputs the temperature correction signal S2c to a lens position detection signal correction section 19. Incidentally, in the same manner as in the second embodiment discussed above, in the lens controlling device 10 of the third embodiment, a current supply 15 is built as a constant current supply which generates a constant drive current Ip according to a predetermined drive current reference value Cur.

The lens position detection signal correction section 19 performs digital correction of a lens position detection signal Vp (a digital signal) which is inputted from an analog/digital converter 12 according to the temperature correction signal S2c such that a motor current Im is zero. Here, the lens position detection signal correction section 19 includes: an offset circuit 191 (see step (1) of FIG. 6) that temporarily offsets the lens position detection signal Vp to a zero position; an amplifier 192 (see step (2) of FIG. 6) that performs digital amplification of the output signal of the offset circuit 191 by a gain in accordance with the temperature correction signal S2c; and an offset circuit 193 (see step (3) of FIG. 6) that offsets the lens position detection signal Vp' resulting from the digital amplification again to the original position.

Figure 6:
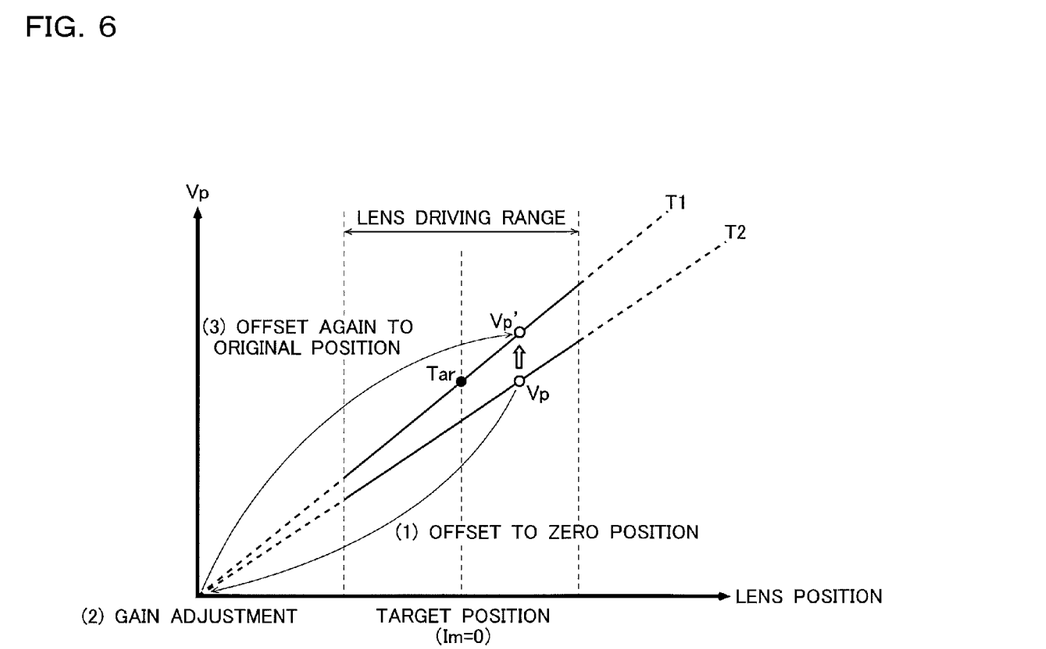
FIG. 6 A diagram for illustrating an operation of correcting a lens position detection signal Vp.

FIG. 6 is a diagram for illustrating an operation of correcting the lens position detection signal Vp performed in the third embodiment. In FIG. 6, the horizontal axis indicates the lens position, while the vertical axis indicates the lens position detection signal Vp.

As shown in the figure, in the lens controlling device 10 of the third embodiment, the target lens position setting signal Tar is corrected (from Vp to Vp') not by simply comparing the target lens position setting signal Tar that is set on the assumption that the temperature is T1 and a lens position detection signal Vp that is detected when the temperature is T2, but by cancelling out an amount by which the lens position detection signal Vp varies due to the temperature characteristic of the photo reflector 2. By correcting the lens position detection signal Vp in this manner, like in the above-discussed first and second embodiments, it is possible to correctly drive the lens unit 1 to its target position without depending on the temperature characteristic of the photo reflector 2.

Also, with the lens controlling device 10 of the third embodiment, the operation of correcting the lens position detection signal Vp can be achieved simply by digital processing, it is easy to enhance the digital resolution capability of the amplifier 192 (corresponding to the step of correcting the lens position detection signal Vp), and it is possible to make the motion of the lens unit 1 less visible during the correction operation in comparison with the above-discussed first embodiment.

Also, the lens controlling device 10 of the third embodiment, in which feedback is performed with respect to a servoloop itself that generates the motor current Im from the lens position detection signal Vp, is excellent in followability to, and stability against, temperature change.

However, it should be noted that the lens controlling device 10 of the third embodiment has a heavy calculation load, because high-speed calculation processing needs to be performed for correction at the lens position detection signal correction section 19.

Combination of Embodiments

The first to third embodiments discussed above each deal with a configuration where one of the drive current of the photo reflector, the target lens position setting signal, and the lens position detection signal is independently corrected, but this is not meant to limit the present invention. It is possible to adopt a configuration where analog correction of the drive current of the photo reflector is performed and digital correction of the target lens position setting signal is performed (the first embodiment+the second embodiment), or a configuration where analog correction of the drive current of the photo reflector is performed and digital correction of the lens position detection signal is performed (the first embodiment and the third embodiment).

INDUSTRIAL APPLICABILITY

The present invention is a technology applicable to, for example, a camera module provided with hand-movement blurring correcting function and a digital still camera, a digital video camera, and a mobile phone terminal incorporating the camera module.

OTHER MODIFIED EXAMPLES

It should be understood that, other than the embodiments described above, many modifications and variations are possible within the spirit of the present invention. All the illustrated embodiments disclosed herein should be considered as examples in all respects and not limitative. The scope of the invention is not limited to the above explanation, but should be understood to include all changes and modifications that fall within metes and bounds of the claims, or equivalence of such metes and bounds thereof are therefore intended to be embraced by the claims.

LIST OF REFERENCE NUMERALS

1 lens unit
2 photo reflector (proximity sensor)
3 lens drive motor
4 resistor
10 lens controlling device (semiconductor device)
11 amplifier
12 analog/digital converter
13 servo calculation section
131 offset circuit
132 filter circuit (PID+LPF)
14 motor driver
15 current supply
16 low-pass filter
17 temperature correction calculation section
171, 173 amplifier
172 integrator
174 offset circuit
18 target lens position setting signal correction section
181, 183 offset circuit
182 amplifier
19 lens position detection signal correction section
191, 193 offset circuit
192 amplifier

What is claimed is:

1. A lens controlling device, comprising:
   a servo calculation section which calculates a motor current setting value such that a lens position detection signal which is inputted from a photo reflector agrees with a predetermined target lens position setting signal;
   a motor driver which generates a motor current in accordance with the motor current setting value and supplies the motor current to a lens drive motor; and
   a temperature correction calculation section which monitors the motor current setting value to generate a temperature correction signal, and corrects either one of the target lens position setting signal and the lens position detection signal.

2. The lens controlling device of claim 1,
   wherein
   the temperature correction calculation section further corrects a drive current of the photo reflector.

3. The lens controlling device of claim 2,
   wherein
   the temperature correction calculation section includes an integrator which integrates the motor current setting value, and the temperature correction calculation section generates the temperature correction signal based on an output signal of the integrator.

4. The lens controlling device of claim 2, further comprising:
   a current supply which performs analog correction of the drive current of the photo reflector according to the temperature correction signal.

5. The lens controlling device of claim 1,
   wherein
   the temperature correction calculation section includes an integrator which integrates the motor current setting value, and the temperature correction calculation section generates the temperature correction signal based on an output signal of the integrator.

6. A lens controlling device, comprising:
   a servo calculation section which calculates a motor current setting value such that a lens position detection signal which is inputted from a photo reflector agrees with a predetermined target lens position setting signal;
   a motor driver which generates a motor current in accordance with the motor current setting value and supplies the motor current to a lens drive motor; and a temperature correction calculation section which monitors the motor current setting value to generate a temperature correction signal, and corrects a drive current of the photo reflector, wherein the temperature correction calculation section includes an integrator which integrates the motor current setting value, and the temperature correction calculation section generates the temperature correction signal based on an output signal of the integrator.

7. The lens controlling device of claim 6, further comprising:
a low-pass filter which is disposed at a former stage of the temperature correction calculation section, and smoothes the motor current setting value.

8. The lens controlling device of claim 6, further comprising:
an analog/digital converter which is disposed at a former stage of the servo calculation section, and performs analog/digital conversion of the lens position detection signal.

9. The lens controlling device of claim 6, further comprising:
a current supply which performs analog correction of the drive current of the photo reflector according to the temperature correction signal.

10. The lens controlling device of claim 1, further comprising:
a low-pass filter which is disposed at a former stage of the temperature correction calculation section, and smoothes the motor current setting value.

11. The lens controlling device of claim 1, further comprising:
an analog/digital converter which is disposed at a former stage of the servo calculation section, and performs analog/digital conversion of the lens position detection signal.

12. The lens controlling device of claim 1, further comprising:
a target lens position setting signal correction section which performs digital correction of the target lens position setting signal according to the temperature correction signal.

13. The lens controlling device of claim 1, further comprising:
a lens position detection signal correction section which performs digital correction of the lens position detection signal according to the temperature correction signal.

14. An imaging apparatus comprising:
a lens unit;
a photo reflector which irradiates the lens unit with light, and generates a lens position detection signal in accordance with intensity of reflected light;
a lens drive motor which drives the lens unit according to a motor current; and
a lens controlling device which generates the motor current and supplies the motor current to the lens drive motor, wherein the lens controlling device includes:
a servo calculation section which calculates a motor current setting value such that a lens position detection signal which is inputted from the photo reflector agrees with a predetermined target lens position setting signal;
a motor driver which generates the motor current in accordance with the motor current setting value and supplies the motor current to the lens drive motor; and
a temperature correction calculation section which monitors the motor current setting value to generate a temperature correction signal, and corrects either one of the target lens position setting signal and the lens position detection signal.

15. An imaging apparatus, comprising:
a lens unit;
a photo reflector which irradiates the lens unit with light and generates a lens position detection signal in accordance with intensity of reflected light;
a lens drive motor which drives the lens unit according to a motor current; and
a lens controlling device which generates the motor current and supplies the motor current to the lens drive motor, wherein the lens controlling device includes:
a servo calculation section which calculates a motor current setting value such that the lens position detection signal which is inputted from the photo reflector agrees with a predetermined target lens position setting signal;
a motor driver which generates the motor current in accordance with the motor current setting value and supplies the motor current to the lens drive motor; and
a temperature correction calculation section which monitors the motor current setting value to generate a temperature correction signal, and corrects a drive current of the photo reflector; and wherein the temperature correction calculation section includes an integrator which integrates the motor current setting value, and the temperature correction calculation section generates the temperature correction signal based on an output signal of the integrator.

* * * * *